US006586548B2

(12) United States Patent
Bonafini, Jr. et al.

(10) Patent No.: US 6,586,548 B2
(45) Date of Patent: Jul. 1, 2003

(54) POLYMERIC BIOMATERIALS CONTAINING SILSESQUIXANE MONOMERS

(75) Inventors: James A. Bonafini, Jr., Pittsford, NY (US); Joseph C. Salamone, Boca Raton, FL (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 10/023,557

(22) Filed: Dec. 17, 2001

(65) Prior Publication Data

US 2002/0128414 A1 Sep. 12, 2002

Related U.S. Application Data

(60) Provisional application No. 60/256,712, filed on Dec. 19, 2000.

(51) Int. Cl.[7] .............................................. C08F 130/08
(52) U.S. Cl. .................... 526/279; 526/321; 526/328.5; 526/347
(58) Field of Search ................. 526/279, 321, 526/328.5, 347

(56) References Cited

U.S. PATENT DOCUMENTS

| | | | |
|---|---|---|---|
| 4,152,508 A | 5/1979 | Ellis et al. .................. 526/279 |
| 4,330,383 A | 5/1982 | Ellis et al. ............. 204/159.13 |
| 4,508,884 A | 4/1985 | Wittmann et al. .......... 526/279 |
| 4,602,074 A | 7/1986 | Mizutani et al. ............ 526/245 |
| 4,686,267 A | 8/1987 | Ellis et al. .................. 526/245 |
| 4,743,667 A | 5/1988 | Mizutani et al. ............ 526/245 |
| 4,826,889 A | 5/1989 | Ellis et al. ..................... 522/99 |
| 4,826,936 A | 5/1989 | Ellis ........................... 526/258 |
| 4,861,850 A | 8/1989 | Novicky ..................... 526/243 |
| 4,996,275 A | 2/1991 | Ellis et al. .................. 526/245 |
| 5,412,053 A | 5/1995 | Lichtenhan et al. ........... 528/9 |
| 5,484,867 A | 1/1996 | Lichtenhan et al. ........... 528/9 |
| 5,589,562 A | 12/1996 | Lichtenhan et al. ........... 528/9 |
| 6,362,279 B2 * | 3/2002 | Lichtenhan et al. ........ 525/105 |

OTHER PUBLICATIONS

Haddad et al. Mat. Res. Symp. Proc. (1996), 435, 25–32.*
Pyun et al. Macromolecules (2000), 33, 217–220.*
Lichtenhan et al. Macromolecules (1995), 28, 8435–8437.*
Haddad et al. Macromolecules (1996), 29, 7302–7304.*
Chemical Abstracts, vol. 96, No. 20, May 17, 1982, p. 35, col. 2, abstract No. 163657, "Silicone Compounds".

* cited by examiner

Primary Examiner—Helen L. Pezzuto
(74) Attorney, Agent, or Firm—John E. Thomas

(57) ABSTRACT

The invention provides a biocompatible copolymer produced by polymerizing a mixture comprising at least one monomer selected from the group consisting of itaconates, (meth)acrylates, fumarates and styrenics, at least one ethylenically unsaturated organosiloxane monomer and at least one monomer comprising a POSS compound.

11 Claims, No Drawings

POLYMERIC BIOMATERIALS CONTAINING SILSESQUIXANE MONOMERS

This application claims benefit of provisional application Ser. No. 60/256,712 filed Dec. 19, 2000.

BACKGROUND OF THE INVENTION

This invention relates to improved copolymers useful as biocompatible materials. Specifically, this invention relates to copolymers useful as ophthalmic lenses, for example, contact lenses.

Early hard contact lenses were produced from polymethyl methacrylate (PMMA) or cellulose acetate butyrate (CAB). Rigid, gas permeable (RGP) contact lenses formed of silicone-containing copolymers offered various advantages over PMMA and CAB lenses (particularly increased oxygen permeability). Another example of an RGP material is a copolymer comprising a silicone-containing monomer and methyl methacrylate.

A newer class of copolymers for silicone-containing RGP lenses is itaconate ester copolymers. U.S. Pat. Nos. 4,152,508 (Ellis et al.), 4,330,383 (Ellis et al.) and 4,826,889 (Ellis et al.) disclose copolymers for contact lenses prepared from: a monofunctional siloxanyl ester monomer; an itaconate ester; an ester of a monohydric or polyhydric alkanol or phenol and a (meth)acrylic acid; a crosslinking agent; and preferably a hydrophilic monomer.

Known copolymers for RGP lenses also include copolymers of fluorinated itaconate esters, such as the copolymers disclosed in U.S. Pat. Nos. 4,686,267 (Ellis et al.) and 4,996,275 (Ellis et al.), which are prepared from a fluorinated itaconate ester and an ethylenically unsaturated organosiloxane.

Other examples of itaconate ester copolymers for RGP lenses are disclosed in the following U.S. Pat. Nos. 4,602,074 (Mizutani et al.); 4,508,884 (Wittmann et al.); 4,743,667 (Mizutani et al.); 4,826,936 (Ellis); and 4,861,850 (Novicky).

As disclosed in U.S. Pat. No. 4,152,508, the itaconate ester provides rigidity, hardness and some degree of wettability to the resultant copolymer. But the inclusion of an itaconate ester tends to make the resultant copolymers more brittle. This illustrates a major challenge in the development of new ophthalmic lens materials: that adding a given monomer to a polymer mix with the goal of attaining a particular characteristic may inherently include other less desirable characteristics. For example, silicone-containing monomers may desirably contribute rigidity, while undesirably decreasing toughness.

Certain multifunctional organosiloxanes have been described as useful for adding higher impact strength and reducing brittleness of itaconate RGP copolymers. U.S. Pat. No. 4,826,936 describes a class of multifunctional organosiloxanes having such properties.

Silsesquioxane macromers are silicon-containing cage molecules based upon the structure of oxygen and silicon tetrahedrons. Silsesquioxane macromers can be polymerized to produce heat-resistant materials such as high-temperature plastics. Examples of silsesquioxane-containing materials are disclosed in U.S. Pat. Nos. 5,412,053; 5,484,867; and 5,589,562 (all to Lichtenhan et al.). While bulky materials containing silicon and oxygen have been of interest to improve the oxygen permeability of biocompatible materials such as contact lens materials, those materials are markedly different than the heat-resistant materials that are the subject of ongoing research relating to silsesquixane macromers.

Thus it would be desirable to improve the oxygen permeability of biocompatible materials without sacrificing other essential properties. In particular, it would also be desirable to provide a biocompatible material that is optically clear, and also has excellent machinability and toughness.

SUMMARY OF THE INVENTION

The present invention relates to silsesquioxane-containing copolymers that are useful as biocompatible materials. The copolymers of the invention are the polymerization product of a mixture comprising:

(a) a monomer selected from the group consisting of itaconates, (meth)acrylates, fumarates and styrenes;

(b) an ethylenically unsaturated organosiloxane monomer; and (c) a POSS compound containing at least one substituent group comprising a polymerizable activated unsaturated group.

The monomers useful for polymerizing with POSS compounds in accordance with the invention include any ethylenically unsaturated monomer, for example, alkyl methacrylates such as methyl methacrylate and neopentyl methacrylate, as well as aromatic methacrylates such as benzyl methacrylate.

Halogenated methacrylates and itaconates are also useful monomers in the present invention. Examples include fluoroalkyl methacrylates such as hexafluoroisopropyl methacrylate and trifluoroethyl methacrylate, and halogenated itaconates such as bis (1,1,1,3,3,3-hexafluoro-2-propyl) itaconate.

Aromatic ring compounds may also be useful as monomers in the present invention. Examples of suitable aromatic monomers include alkyl substituted styrenes such as t-butyl styrene. Other useful monomers include vinyl lactams and n-vinyl pyrrolidone.

Hydrophilic monomers such as (meth)acrylic acid and (meth) acrylamides such a N,N-dimethylacrylamide are also useful in the invention.

Monomers useful in the present invention may also contain two or more functional groups of the type listed above.

DETAILED DESCRIPTION OF THE INVENTION

The materials of the present invention contain functionalized monomers based upon silsesquioxane ("POSS") compounds. The POSS compounds useful as monomers in accordance with the invention can be produced by general methods known in the art, such as the methods disclosed in U.S. Pat. Nos. 5,412,053; 5,484,867; and 5,589,562 (all to Lichtenhan et al.).

The general cage structure of one example of a silsesquioxane-based monomeric unit is shown below as Structure (I).

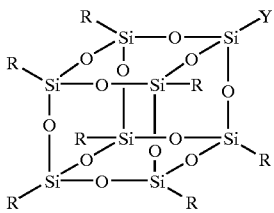

(I)

wherein:

each Y is independently an activated unsaturated radical; and each R is independently selected from the group consisting of a $C_1$–$C_{12}$ monovalent hydrocarbon radical, a $C_1$–$C_{12}$ monovalent hydrocarbon radical containing ether linkages, a halogen-substituted $C_1$–$C_{12}$ monovalent hydrocarbon radical, and a halogen-substituted $C_1$–$C_{12}$ monovalent hydrocarbon radical containing ether linkages.

Silsesquioxane-based polymers useful in the present invention may have smaller or large cage sizes than the structure shown above, and may also comprise closed or open cage structures.

The silsesquioxane-based polymers useful in the invention must contain at least one polymerizable site, preferably an ethylenically unsaturated site. Structures (II) and (III) illustrate examples of suitable closed-cage monomers. Structure III represents a preferred monomer.

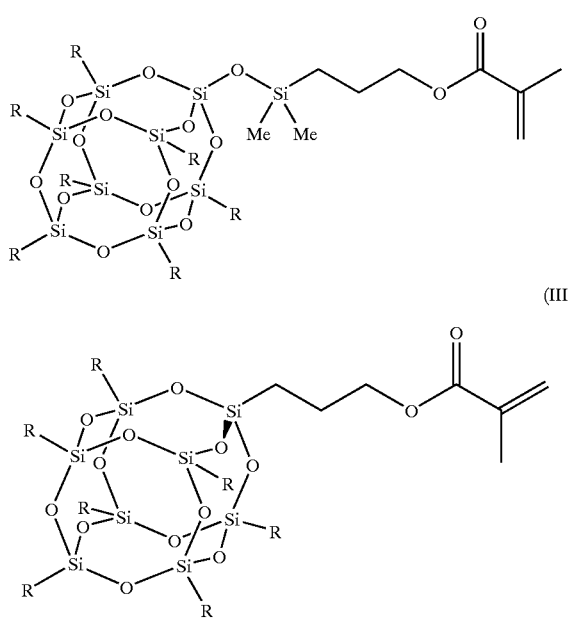

(II)

(III)

The polymers of the invention may further include one or more open-cage monomers as shown below by Structure (IV).

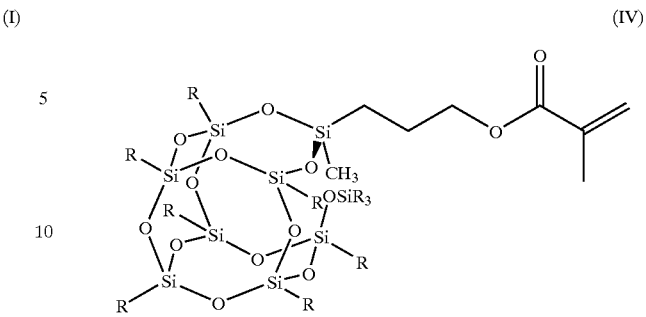

(IV)

The term "polyhedral oligomeric silsesquioxane" or "POSS" as used herein describes a type of three-dimensional siloxane molecule in which at least two siloxane rings form a rigid molecular structure. Both open-cage and closed cage POSS monomers are useful in the present invention.

The term "closed-cage POSS monomer" means a polyhedral oligomeric silsesquioxane monomer in which each ring-member silicon atom is linked to three other ring-member silicon atoms through oxygen atoms.

The term "open-cage POSS monomer" means a polyhedral oligomeric silsesquioxane monomer in which at least two silicon atoms are each linked to no more than two other ring-member silicon atoms through oxygen atoms.

The polymers of the invention may optionally contain a hydrophilic monomer.

The materials of the invention are biocompatible. The materials are particularly useful as rigid gas permeable (RGP) contact lens materials due to their improved toughness, oxygen permeability and flexure resistance.

In accordance with the invention, it has been found that POSS compounds are especially effective in improving the oxygen permeability and flexure resistance of biocompatible polymeric materials.

Polysilsesquioxanes (POSS materials) are represented by the formula $[RSiO_{1.5}]\lambda$ where $\lambda$=molar degree of polymerization and R=organic substituent (H, siloxy, cyclic or linear aliphatic or aromatic groups that may additionally contain reactive functionalities such as alcohols, esters, amines, ketones, olefins, ethers or halides). Polysilsesquioxanes may be either homoleptic or heteroleptic. Homoleptic systems contain only one type of R group while heteroleptic systems contain more than one type of R group.

POSS and POS nanostructure compositions are represented by the formula:

$[(RSiO_{1.5})_n]\lambda\#$ for homoleptic compositions;

$[(RSiO_{1.5})_m(R'SiO_{1.5})_n]\lambda\#$ for heteroleptic compositions (where R≠R'); and $[(RSiO_{1.5})_m(RXSiO_{1.0})_n]\lambda\#$ for functionalized heteroleptic compositions (where R groups can be equivalent or inequivalent).

In all of these formulae, R is the same as defined above for Structure (I) and X includes but is not limited to OH, Cl, Br, I, alkoxide (OR), acetate (OOCR), peroxide (OOR), amine ($NR_2$) isocyanate (NCO), and R. The symbols m and n refer to the stoichiometry of the composition. The symbol $\lambda$ indicates that the composition forms a nanostructure and the symbol # refers to the number of silicon atoms contained within the nanostructure. The value for # is usually the sum of m+n. It should be noted that $\lambda\#$ is not to be confused as a multiplier for determining stoichiometry, as it merely describes the overall nanostructural characteristics of the system (also referred to as "cage size").

Structures (V) through (VIII), below, illustrate examples of a POSS monomers in which λ=6, 8, 10 and 12, respectively.

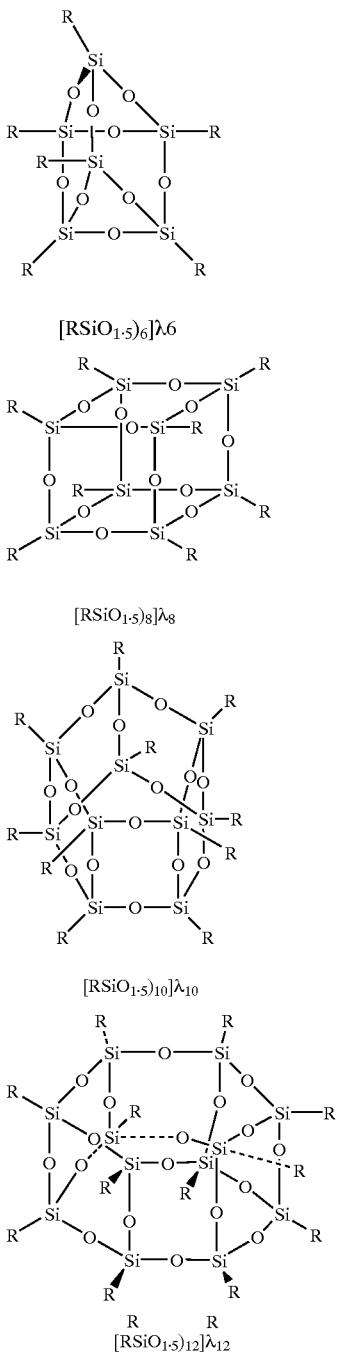

[RSiO$_{1.5}$)$_6$]λ6

[RSiO$_{1.5}$)$_8$]λ8

[RSiO$_{1.5}$)$_{10}$]λ10

[RSiO$_{1.5}$)$_{12}$]λ12

The POSS monomer is preferably employed at 5 to 60% by weight of the monomeric mixture from which the copolymer is prepared in order to provide copolymers having sufficient ridigity and hardness. According to preferred embodiments, the POSS monomer is present at 20 to 85 weight percent, with 30 to 65 weight percent being more preferred, in the monomeric mixture.

The itaconates are known in the art and include compounds of structure (IX):

(IX)

wherein X and Y, which may be the same or different, are independently: hydrogen; $C_1$–$C_{18}$ alkyl or fluoro-substituted alkyl groups; $C_5$–$C_{18}$ cycloalkyl or fluoro-substituted alkyl groups; $C_2$–$C_6$ alkenyl groups or fluoro-substituted alkenyl groups; phenyl groups or fluoro-substituted phenyl groups; benzyl or fluoro-substituted benzyl groups; phenethyl or fluoro-substituted phenethyl groups; or $C_2$–$C_{18}$ ether or fluoro-substituted ether groups; provided that at least one of X and Y is other than hydrogen.

Representative meth(acryaltes) include esters of $C_1$–$C_{20}$ monohydric or polyhydric alkanol or phenol and (meth)acrylic acid. Representative meth(acrylate) monomers include: alkyl (meth)acrylates, such as methyl methacrylate, ethyl methacrylate, and neopentyl methacrylate; cycloalkyl-containing (meth)acrylates, such as cyclohexyl methacrylate; and phenyl methacrylate. This (meth)acrylate may be included in the monomeric mixture at 0 to about 50 weight percent, more preferably at about 5 to about 35 weight percent.

Itaconates may be used to partially or completely replace meth(acrylate) compounds in the present invention. Representative itaconates include methyl itaconate, dimethyl itaconate, phenyl itaconate, methyl phenyl itaconate, bis (1,1,1,3,3,3-hexafluoro-2-propyl) itaconate, bis (2,2,2-trifluoroethyl) itaconate, bis (1H,1H-perfluorooctyl) itaconate, bis (1H,1H,1H-perfluoroundecyl) itaconate, bis (perfluoro-t-butyl) itaconate, bis (pentafluorophenyl) itaconate, bis (2H,2H-perfluorobenzyl) itaconate, and bis (pentafluorophenylmethyl) itaconate.

Itaconates may comprise up to 60% by weight of the monomeric mixture from which the copolymer is prepared in order to provide copolymers having sufficient rigidity and hardness. If itaconates are included in the monomer mixture, they are typically present in concentrations of 20 to 55 weight percent, preferably 30 to 50 weight percent.

As recognized in the art, when an itaconate is used in place of, or in combination with, methyl methacrylate, the resultant copolymer has increased rigidity and hardness. However, the inclusion of the itaconate ester also tends to make the resultant copolymer more brittle. RGP contact lens materials are frequently provided in the form of rods, buttons, or lens blanks, which are subsequently machined into contact lenses having desired lens surfaces. When the copolymeric material is brittle, difficulties can be encountered in machining such materials, such as chipping or flaking or even breakage of the material.

In accordance with the invention, it has been found that POSS monomers can effectively toughen the resultant copolymer, thereby overcoming the disadvantages attributed to the itaconate monomer. The copolymers represent improved itaconate-containing RGP materials having optical clarity, reduced brittleness, and improved toughness. Preferably, the POSS-containing polymers have a toughness of at least about 1.2 MPa·mm/mm (as determined by ASTM D 790M-86 standards), and more preferably, a toughness of at least about 1.5 MPa·mm/mm.

Multifunctional organosiloxanes have been described as useful in contact lens formulations, including siloxane compounds of the general formula shown below as Structure (XI).

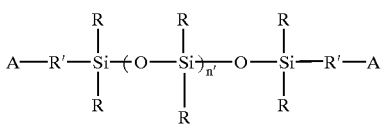

(wherein A, R' and R generally correspond to the definitions given for formula (II), and n' has various ranges), Applicants have found that for POSS-containing contact lens materials, it is preferred to include an organosiloxane monomer.

In a preferred embodiment, the organosiloxane compound has the structure shown above as Structure (XI), and n averages at least about 15.

In Structure (XI), A is an activated unsaturated radical, i.e., an unsaturated group that includes a substituent for facilitating free radical polymerization, preferably a vinyl-containing substituent. Representative A radicals include (meth)acryloxy, (meth)acrylamido and styryl. (As used herein, the term "(meth)" denotes optional methyl substitution. Thus, a term such as "(meth)acrylate" denotes "acrylate or methacrylate".) The methacryloxy radical is more preferred.

Each R' is independently a $C_1$–$C_{22}$ divalent hydrocarbon radical. Representative R' radical include alkylene radicals, and preferred radicals include methylene, propylene and butylene.

Each R is independently selected from the group consisting of a $C_1$–$C_{12}$ monovalent hydrocarbon radical, a $C_1$–$C_{12}$ monovalent hydrocarbon radical containing ether linkages, a halogen-substituted $C_1$–$C_{12}$ monovalent hydrocarbon radical, and a halogen-substituted $_1$–$C_{12}$ monovalent hydrocarbon radical containing ether linkages. Representative R radicals include alkyl, cycloalkyl, aryl, aralkyl, alkaryl radicals, alkoxyalkyl radicals, and halogen-substituted derivatives thereof. Preferred radicals include $C_1$–$C_4$ alkyl, with methyl being especially preferred.

The siloxane compound is employed in an amount effective to reduce the brittleness of the resultant copolymer. Generally, the siloxane compound should be present at about 3 to about 25 weight percent of the initial monomeric mixture, more preferably at about 5 to about 20 weight percent, with about 9 to about 15 weight percent being especially preferred. One skilled in the art can readily determine optimal amounts for specific formulations.

The ethylenically unsaturated organosiloxane monomer (exclusive of the POSS compound) is useful for increasing oxygen permeability of the copolymer. Preferred organosiloxanes are monofunctional organosiloxane containing a (meth)acrylate radical, such as tris(trimethylsiloxy) methacryloxypropylsilane, pentamethyldisiloxanylmethyl methacrylate, heptamethylcyclotetrasiloxanepropyl methacrylate, heptamethylcyclotetrasiloxanemethyl methacrylate and methyldi(trimethylsiloxy) methacryloxymethylsilane. Other organosiloxane monomers known in the art are described in U.S. Pat. No. 4,686,267, the disclosure of which is incorporated herein by reference. The organosiloxane monomer may be included in the monomeric mixture at about 2 to about 60 weight percent, more preferably at about 5 to about 50 weight percent.

A hydrophilic monomer may be added to the reaction mixture for increasing hydrophilicity and improving wettability of the resultant copolymer. Conventional hydrophilic monomers include: hydrophilic (meth)acrylates, such as 2-hydroxyethyl methacrylate; hydrophilic (meth) acrylamides, such as methacrylamide and N,N-dimethylacrylamide; (meth)acrylic carboxylic acids, such as methacrylic acid; and vinyl lactams, such as N-vinylpyrrolidone. The hydrophilic monomer may be included in the monomeric mixture at about 1 to about 25 weight percent, more preferably at about 3 to about 15 weight percent.

Other materials known for contact lens formulations can be employed in the monomeric mixture from which the itaconate copolymer is prepared.

A (meth)acrylate monomer may be included which further modifies hardness of the copolymer. Such monomers are preferably an ester of a $C_1$–$C_{20}$ monohydric or polyhydric alkanol or phenol and (meth)acrylic acid. Representative monomers include: alkyl (meth)acrylates, such as methyl methacrylate, ethyl methacrylate, and neopentyl methacrylate; cycloalkyl-containing (meth)acrylates, such as cyclohexyl methacrylate; and phenyl methacrylate. This (meth) acrylate may be included in the monomeric mixture at 0 to about 50 weight percent, more preferably at about 5 to about 35 weight percent.

A conventional non-silicone containing crosslinking agent may be employed. Crosslinking agents include polyfunctional derivatives of (meth)acrylic acid, (meth) acrylamide and other multi-vinyl substituted compounds. Representative crosslinking agents include: ethylene glycol dimethacrylate, diethylene glycol dimethacrylate, triethylene glycol dimethacrylate, tetraethylene glycol dimethacrylate, neopentyl glycol dimethacrylate, trimethylolpropane trimethacrylate, hexamethylene bisacrylamide and divinyl benzene. The crosslinking agent may be included in the monomeric mixture at 0 to about 20 weight percent, more preferably at about 1 to about 10 weight percent.

Accordingly, preferred copolymers are prepared from a monomeric mixture comprising:

(a) an itaconate ester at about 0 to about 60 weight percent, preferably about 20 to about 55 weight percent;

(b) a POSS compound (I) at about 3 to about 85 weight percent, preferably about 5 to about 60 weight percent, and more preferably about 10 to about 25 weight percent;

(c) a siloxane compound of formula (II) at about 3 to about 25 weight percent, preferably about 5 to about 20 weight percent, and more preferably about 9 to about 15 weight percent;

(d) an ethylenically unsaturated organosiloxane monomer at about 2 to about 60 weight percent, preferably about 5 to about 50 weight percent;

(e) a hydrophilic monomer at about 1 to about 25 weight percent, preferably about 3 to about 15 weight percent;

(f) a (meth)acrylate monomer at 0 to about 50 weight percent, preferably about 5 to about 35 weight percent; and (g) a crosslinking agent at 0 to about 20 weight percent, preferably about 1 to about 10 weight percent.

Other optional components include conventional free radical initiators, which are generally employed at 0.01 to 2% by weight, and coloring agents.

The monomeric mixtures can be polymerized by methods known in the art, preferably in the presence of heat or ultraviolet radiation, and if desired, the copolymers can be treated with gamma radiation to reduce any unreacted monomers. Preferably, the mixtures are molded in a shape which is subsequently machined into the form of a contact lens, such as rod stock, a lens button, or a lens blank containing one finished surface. Alternately, the mixtures can be molded directly in the form of a contact lens.

EXAMPLES

The following examples further illustrate preferred embodiments of the invention.

Various copolymers were polymerized from the monomeric mixtures listed in the following tables, wherein the amounts of the individual components are given in parts by weight. The mixtures were placed in cylindrical tubes, and the tubes were deoxygenated and sealed. The mixtures were polymerized by heating in a water bath (40° C. for 3 days), followed by heating in an oven (65° C. for 2 days). Various copolymers were subjected to post-polymerization treatment to reduce unreacted monomers, including exposure to gamma radiation in an inert atmosphere.

Toughness and modulus were determined according to ASTM-D 790M-86 standards on 0.5-mm disk samples cut from the polymerized rods. Standard deviation is listed parenthetically in the tables. Permeability was determined on 0.5-mm disk samples in accordance with ANSI Z80.20 and ISO 9913-1.2:1996 "Determination of Oxygen Permeability and Transmissibility with the FATT Method".

The results are summarized in the following tables, which include the following abbreviations:

1. POSS-(Polyhedral Oligomeric Silsesquioxane) where R is cyclopentyl or isobutyl.
2. AIBN-2,2-azobisisobutyronitrile (initiator).
3. AIVN-2,2-azobisisovaleronitrile (initiator).
4. BHI-bis(1,1,1,3,3,3 -hexafluoro-2-propyl) itaconate.
5. MAA-methacrylic acid.
6. MMA-methyl methacrylate.
7. NPGDMA-neopentyl glycol dimethacrylate.
8. NPMA-neopentyl methacrylate.
9. NVP-N-vinylpyrrolidone.
10. TRIS-tris(trimethylsiloxy)silylpropyl methacrylate.
11. NFIPM-hexafluoroisopropyl methacrylate.
12. $M_2D_{25}$-Formula (I) wherein each R is methyl, each R' is butylene, each A is methacrylate, and n averages about 25.

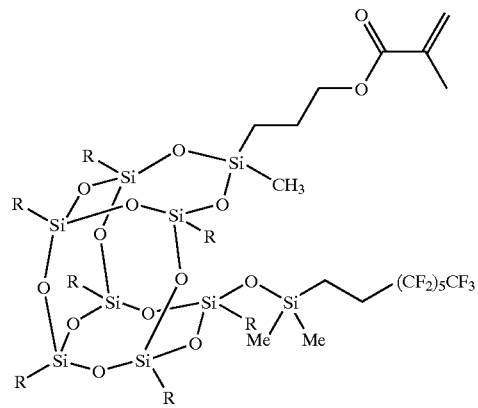

Structure XII

R = cyclopentyl or butyl

| Example No. Consitutent | 1 | 2 | 3 |
|---|---|---|---|
| MMA | 2.5 | 2.5 | 2.5 |
| MAA | 5.5 | 5.5 | 5.5 |
| t-butyl styrene | 38.9 | 38.9 | 38.9 |
| POSS (See Structure 12 where R is cyclopentyl) | 28.5 | 19.1 | 9.4 |
| TRIS | 0 | 9.4 | 19.1 |
| $M_2D_{25}$ | 11.5 | 11.5 | 11.5 |
| NPGDMA | 7 | 7 | 7 |
| NVP | 6.1 | 6.1 | 6.1 |
| AIVN | 0.062 | 0.062 | 0.062 |
| AIBN | 0.19 | 0.19 | 0.19 |
| FD&C GREEN #6 | 0.00979 | 0.00979 | 0.00979 |
| UV Absorber | 0.3 | 0.3 | 0.3 |
| TOTAL | 100 | 100 | 100 |
| Physical Properties | | | |
| Rockwell Hardness | 114 | 113 | 115 |
| Refractive Index | 1.500 | 1.498 | 1.495 |
| Specific Gravity | 1.12 | 1.11 | 1.04 |
| Dk ISO/FATT | 17 | 23 | 34 |
| Modulus (Mpa) | 1649 | 1566 | 1177 |
| Toughness (MPA.mm/mm) | 3.85 | 3.09 | 3.27 |

The data summarized in the above table demonstrate that the POSS compounds of the invention produce optically clear materials having sufficient oxygen permeability and toughness to be suitable for use as RGP contact lens materials.

Although certain preferred embodiments have been described, it is understood that the invention is not limited thereto and modifications and variations would be evident to a person of ordinary skill in the art.

We claim:

1. A biocompatible copolymer produced by polymerizing a mixture comprising:
   (a) at least one monomer selected from the group consisting of itaconates, (meth)acrylates, fumarates and styrenics;
   (b) at least one monomer comprising a POSS compound including an ethylenically unsaturated radical; and
   (c) at least one ethylenically unsaturated organosiloxane monomer.

2. The biocompatible copolymer of claim 1 wherein said POSS compound has the formula:

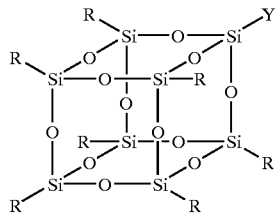

wherein:
   each Y is independently an ethylenically unsaturated radical; and
   each R is independently selected from the group consisting of a $C_1$–$C_{12}$ monovalent hydrocarbon radical, a $C_1$–$C_{12}$ monovalent hydrocarbon radical containing ether linkages, a halogen-substituted $C_1$–$C_{12}$ monovalent hydrocarbon radical, and a halogen-substituted $C_1$–$C_{12}$ monovalent hydrocarbon radical containing ether linkages.

3. The copolymer of claim 1, wherein said POSS monomer has a closed-cage structure.

4. The copolymer of claim 1, wherein said POSS monomer has an open-cage structure.

5. The copolymer of claim 1, wherein the mixture comprises:
   a) the POSS monomer at about 3 to about 25 weight percent;
   b) an ethylenically unsaturated, monofunctional organosiloxane monomer at about 2 to about 60 weight percent;
   c) a hydrophilic monomer at about 1 to about 25 weight percent;
   d) a hardness modifying (meth)acrylate monomer at 0 to about 50 weight percent; and
   e) a non-silicone containing crosslinking agent at 0 to about 20 weight percent.

6. A contact lens material made of the copolymer of claim 1.

7. A contact lens material made of the copolymer of claim 2.

8. A contact lens material made of the copolymer of claim 5.

9. A contact lens made of the copolymer of claim 1.

10. A contact lens made of the copolymer of claim 2.

11. A contact lens made of the copolymer of claim 5.

* * * * *